(12) United States Patent
Li et al.

(10) Patent No.: US 11,593,254 B1
(45) Date of Patent: Feb. 28, 2023

(54) SOFTWARE PATCH RISK DETERMINATION

(71) Applicant: INTERNATIONAL BUSINESS MACHINES CORPORATION, Armonk, NY (US)

(72) Inventors: Shuo Li, Beijing (CN); Xiaobo Wang, Beijing (CN); Sheng Yan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 17/444,518

(22) Filed: Aug. 5, 2021

(51) Int. Cl.
*G06F 11/36* (2006.01)
*G06F 8/65* (2018.01)
*G06N 20/00* (2019.01)

(52) U.S. Cl.
CPC ............ *G06F 11/3676* (2013.01); *G06F 8/65* (2013.01); *G06F 11/3688* (2013.01); *G06N 20/00* (2019.01)

(58) Field of Classification Search
CPC .... G06F 11/3676; G06F 11/3686; G06F 8/65; G06N 20/00
See application file for complete search history.

(56) References Cited

U.S. PATENT DOCUMENTS

| | | | | |
|---|---|---|---|---|
| 2007/0033445 | A1* | 2/2007 | Hirsave | G06F 11/3466 714/47.1 |
| 2011/0314334 | A1* | 12/2011 | Silver | G06F 11/3688 714/E11.178 |
| 2018/0004799 | A1 | 1/2018 | Eker | |
| 2019/0073293 | A1 | 3/2019 | Sharma | |
| 2019/0095470 | A1 | 3/2019 | Dundjerski | |
| 2020/0089665 | A1 | 3/2020 | Yan | |
| 2022/0300640 | A1* | 9/2022 | Shama | G06N 20/00 |
| 2022/0385674 | A1* | 12/2022 | Donbosco | G06N 20/00 |

FOREIGN PATENT DOCUMENTS

CN 109800600 A * 5/2019

* cited by examiner

*Primary Examiner* — Ziaul A Chowdhury
(74) *Attorney, Agent, or Firm* — Teddi E. Maranzano

(57) ABSTRACT

Building a first layer model of a three-layer model based on attributes that are sensitive features is provided. A first dimension reduction of sensitive features removes each sensitive feature having an indicator that it is present in a patch and does not contribute to one or more of three probabilities. A second dimension reduction of insensitive features is performed using vectorizing and using one-hot encoding. The remaining insensitive features are main features. One or more second layer models of the three-layer model is built based on the main features. The third layer model is built based on a verification dataset and the first layer model. Regression test coverage is recommended based on prediction result of the third layer model, and wherein regression tests are selected. The training dataset is updated based on probability calculations of the first layer model.

17 Claims, 8 Drawing Sheets

SOFTWARE PATCH RISK DETERMINATION

BACKGROUND

The present application relates generally to computer software and more specifically to software update management.

Software, such as operating systems, applications, and database management systems (DBMS) are complex computer programs that are typically comprised of a collection of specialized modules. As is typical, software requires maintenance and updates to ensure the proper security, data integrity, and performance of the data under the software's management. The software vendor supplies maintenance in the form of software fixes, also referred to as patches or software maintenance, which are executable code files that are installed into the software, typically to correct a flaw in the software's execution. The patch is often released together with metadata, such as release notes that describe the patch's intended function and impact. The description can include natural language text and other unstructured text data (in addition to structured data and metadata).

Through extensive analysis and testing, the software vendor validates the maintenance for correct execution prior to supplying it to customers, to verify as best as possible that the software performs correctly according to the vendor's published specification. It would be desirable to improve testing of software maintenance to reduce risks to software performance, reliability, and integrity, while improving testing efficiency.

SUMMARY

A method is provided. The method provides for building a first layer model of a three-layer model based on attributes that are sensitive features is provided. A first dimension reduction of sensitive features removes each sensitive feature having an indicator that it is present in a patch and does not contribute to one or more of three probabilities. A second dimension reduction of insensitive features is performed using vectorizing and using one-hot encoding. The remaining insensitive features are main features. One or more second layer models of the three-layer model is built based on the main features. The third layer model is built based on a verification dataset and the first layer model. Regression test coverage is recommended based on prediction result of the third layer model, and wherein regression tests are selected. The training dataset is updated based on probability calculations of the first layer model.

Embodiments are further directed to computer systems and computer program products having substantially the same features as the above-described computer-implemented method.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 4A is a block diagram illustrating building a second layer model 450, in accordance with an illustrative embodiment;

DETAILED DESCRIPTION

Figure 1:
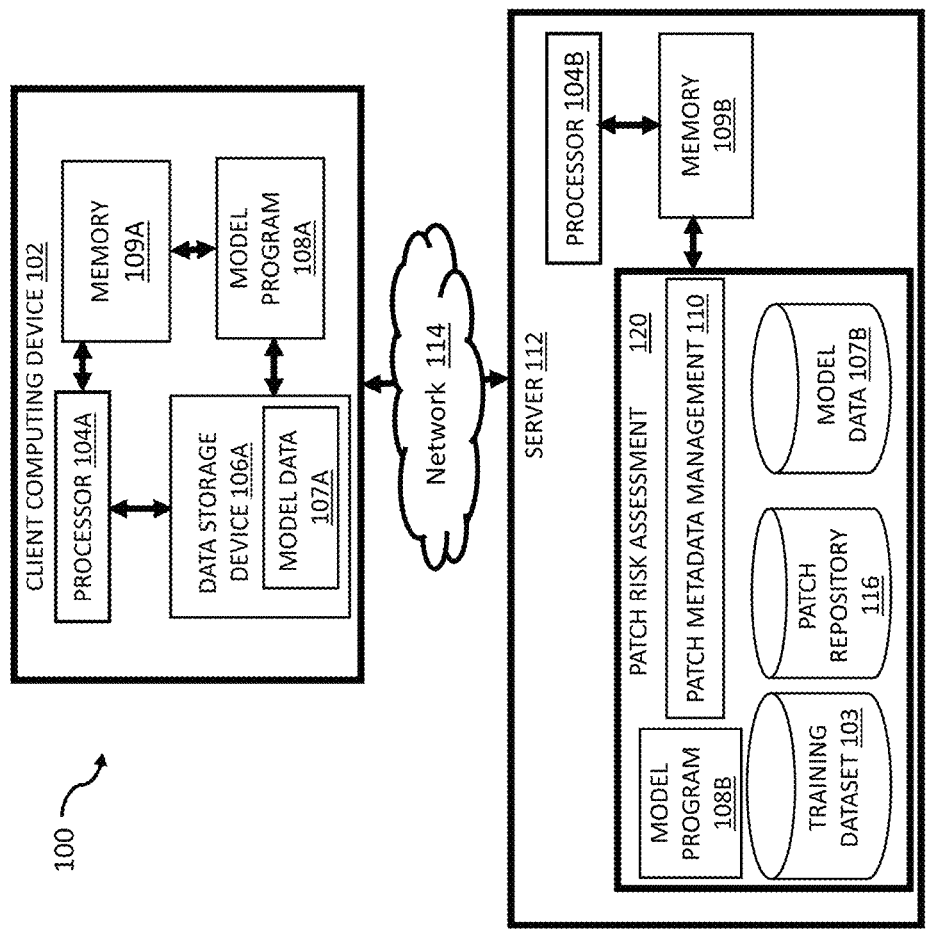
FIG. 1 illustrates an exemplary networked computer environment according to at least one embodiment.

The present application relates generally to computer software and more specifically to software update management.

Regression testing includes running functional and non-functional test suites against a software product, such as an operating system, application, or DBMS, to ensure that the previous version still functions according to its design specifications after the code changes. Changes that may require regression testing include software enhancements, addition of new features, and patches (i.e., fixes) to correct software defects. Regression test suites tend to grow over time because each addition and change to the source code is associated with an additional test suite. This increasing size of the regression test suite necessarily increases the time and system resources to fully validate the software involved. According to vendor estimates, a full regression test of the DB2® DBMS product may require twenty days, with the regression tests running on ten servers in a cluster. (DB2 is a registered trademark of International Business Machines Corporation in the Unites States, or other countries, or both).

In the example DB2® DBMS product, there are in excess of an estimated five hundred features, insensitive and sensitive combined. A model generated from all the features is likely to take too long to train, be difficult to tune, and negatively impact the continuous delivery objective. Such a long service cycle, while beneficial in ensuring product integrity, negatively impacts the continuous delivery objective. Continuous delivery is the goal of deploying software changes of all types into production safely and quickly in a sustainable way. With continuous delivery, code is always in a deployable state, even though software developers are making daily changes.

An inefficiency of the prior art is that in testing, patches are treated the same, without consideration to the varying degrees of risk entailed by applying a specific patch under consideration. While various methods may be employed in an attempt to improve continuous delivery efficiency, these methods typically involve modifications to the flow of the delivery pipeline. Embodiments of the present invention tend to improve regression testing coverage and efficiency by using the metadata associated with the software patch or software feature release to create a multi-layer artificial intelligence (AI) model. Using the model, a risk assessment is determined for the software patch or software feature release. Based on the degree of risk as determined by the model, a percentage of regression test cases in the regression test repository is scheduled in the regression test. For example, a high risk patch may require an execution of a high percentage of the regression tests, perhaps even a full suite of regression testing. As a result, deployment, i.e., delivery to the customer, of the software is accelerated while maintaining software reliability.

Embodiments of the present invention may be applied to software regression testing in general. However, the specific example of database patching is used to facilitate explanation.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104A and memory 109A. A data storage device 106A includes hardware and logic to host and run a model program 108A, and to store model data 107A. The model data 107A and model program 108A may be loaded into the memory 109A for execution by the processor 104A. The model program 108A can be a local instance of the model program 108B, which executes on server 112. The model program 108A can execute various modelling algorithms against patch metadata that is retrieved from the patch repository 116. The output from the model program 108A may be intermediate results, stored as model data 107A, for example, when calculating a final model result is not yet complete. For example, the patch risk assessment system 120 generates an intermediate layer 1 model that becomes input to an intermediate layer 2 model. These models are input to create the final third level model, which will be used to generate the regression test coverage recommendation based on the degree of risk associated with each feature in the patch.

Additionally, the client computing device 102 may invoke the model program 108A to retrieve model data 107B and patch repository 116 data to initiate modelling locally, or to continue operating on an existing model. Allowing offloading of some computations tends to reduce the impact to server and network performance when multiple clients are executing patch risk assessments simultaneously.

As will be discussed with reference to FIG. 9, the client computing device 102 may include internal components 800 and external components 900, respectively.

The client device 102 communicates with the server 112 over communication network 114 to exchange model data 107A. The server 112 and client device 102 may be any programmable electronics device capable of hosting and executing all or part of the patch risk assessment system 120.

The server computer 112 may include the patch risk assessment system 120. The patch risk assessment system 120 includes patch metadata management 110, a patch repository 116, model data 107B, model program 108B, and training dataset 103. The patch repository 116 may include the source code of each patch, as well as the patch metadata. Patch metadata, which may be stored separately from the patch source code in the patch repository 116, includes attributes associated with the patch, such as component, number of modules affected, lines of code, and severity. The patch metadata management 110 receives requests to retrieve or to store patch source code or patch metadata, and directs the request to the appropriate storage area within the patch repository 116. The patch repository 116 includes both patch source code and patch metadata. However, there may be more than one patch repository 116. Additionally, patch fix source code may be stored separately from the patch metadata, for example, as in a dedicated source code management system. The training dataset 103 may be used as input for the probability calculation when building the first layer model. An example row 250 is shown in FIG. 2A. The training dataset 103 is updated with output from each probability calculations.

The model data 107B and model program 108B may be loaded into the memory 109B for execution by the processor 104B. Execution may be initiated across the communication network 114 from one or more of the client computing devices 102 or may be initiated at the server 112 directly. The one or more client computing devices 102 may connect simultaneously to the server 112. The model program 108B can execute various modelling algorithms against patch metadata that is retrieved from the patch repository 116 through the patch metadata management 110 portion of the patch risk assessment system 120. Both intermediate and final modelling results are stored as model data 107B.

As will be discussed with reference to FIG. 9, the server computer 112 may include internal components 800 and external components 900, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Figure 2:
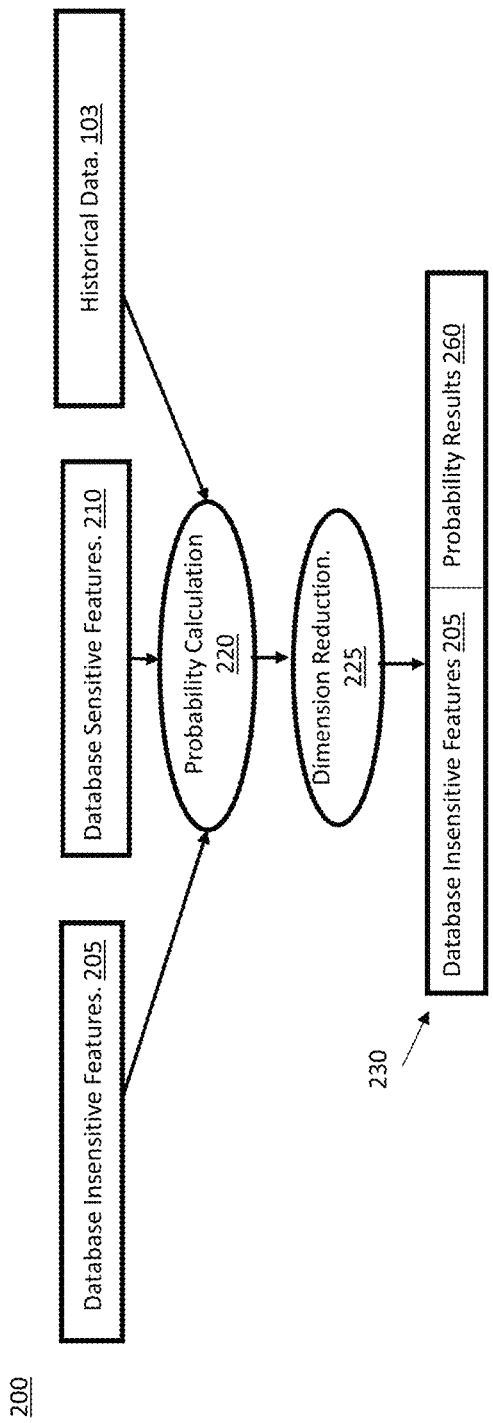
FIG. 2 illustrates building a first layer model 200, according to at least one embodiment.
Figure 2A:
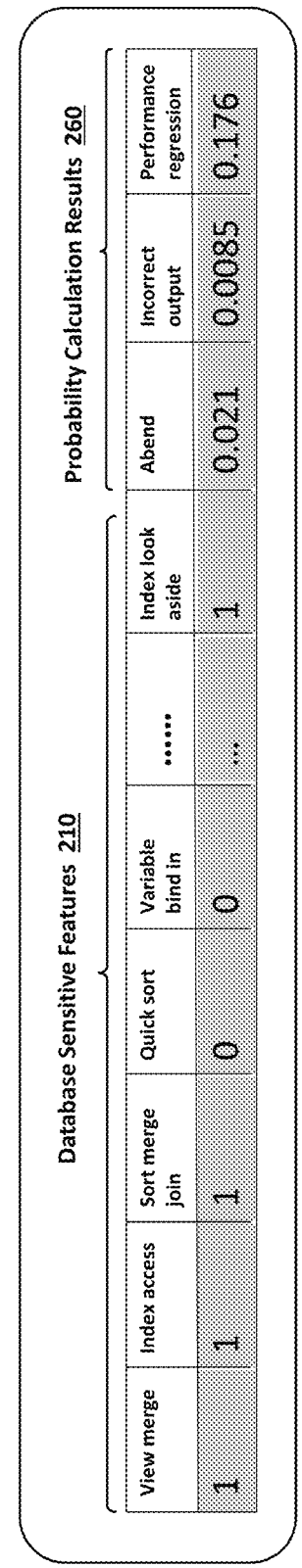
FIG. 2A illustrates an example row of training data 250 as input to the first layer model creation, according to at least one embodiment.

Turning now to FIG. 2, building a first layer model 200 is shown, according to at least one embodiment.

The patch risk assessment system 120 receives as input a patch's releases notes and associated data, e.g., source code, and metadata, e.g., developer's internal release notes. The patch metadata management 110 directs operations to store or to retrieve patch source code or patch metadata, and directs the operation to the appropriate storage area within the patch repository 116.

A problem report, referred to variously as a defect report or authorized program analysis report, etc., accompanies each patch and feature enhancement. The problem report includes several pieces of data that identify the patch. To build the first layer model, the patch metadata management 110 extracts keywords describing the patch and categorizes them as either database sensitive or database insensitive. This process may be performed using known natural language processing techniques.

The database sensitive features 210 refer to operations performed on a target database to modify the data it stores, its structure, its performance, or a combination of them. The database insensitive features 205 are other generic features that do not perform the functions of database sensitive functions but describe the environment of the patch.

For example, the database sensitive features 210 may include features specific to the DBMS, such as access/join method, SQL VIEW, type of sort used, runtime variable binding, data manager (table scan, fast insert, etc.), index manager (look aside, index skipping, etc.), buffer manager (prefetch, latch, page read/write, etc.).

The database insensitive features 205 may include a description of the problem being addressed by the patch, a root cause of the problem, which modules were modified, the number of lines of code affected, severity of the problem, the component affected, version of the patch, etc.

The patch risk assessment system 120, through the model program 108B, builds a first layer model using both the database sensitive features 210 and the database insensitive features 205 to calculate probability values for three outcomes, which are the main categories of database errors: a probability of database abend, a probability of database incorrect output generation, and a probability of database performance regression.

FIG. 2A is an example row 250 in the training dataset 103, showing the universe of defined database sensitive features 210. A flag is set (e.g., "1") for each database sensitive feature 210 that the patch fixes, and a "0" indicates the patch does not affect that feature. The calculated probability 260 is shown.

The model program 108B calculates the probability 220 of each of the three outcomes occurring when the flagged database sensitive features 210 exist. A dimension reduction 225 is performed to eliminate those database sensitive features 210 that are present in the patch, but are "0", and therefore, do not contribute to one of the three outcomes. A classifier technique, for example Naive Bayes, may be used. Removing these database sensitive features 210 accelerates training the first layer model and contributes to a more accurate end result. The output of the probability calculation 220 and the dimension reduction 225 is the first reduced dimension 230. The actual database sensitive features 210 are replaced in the output row of the first reduced dimension 230 by the calculated probability results 260. The output of the first layer model may be stored as model data 107B, or may be retained in memory for further input to the second layer model.

Figure 3:
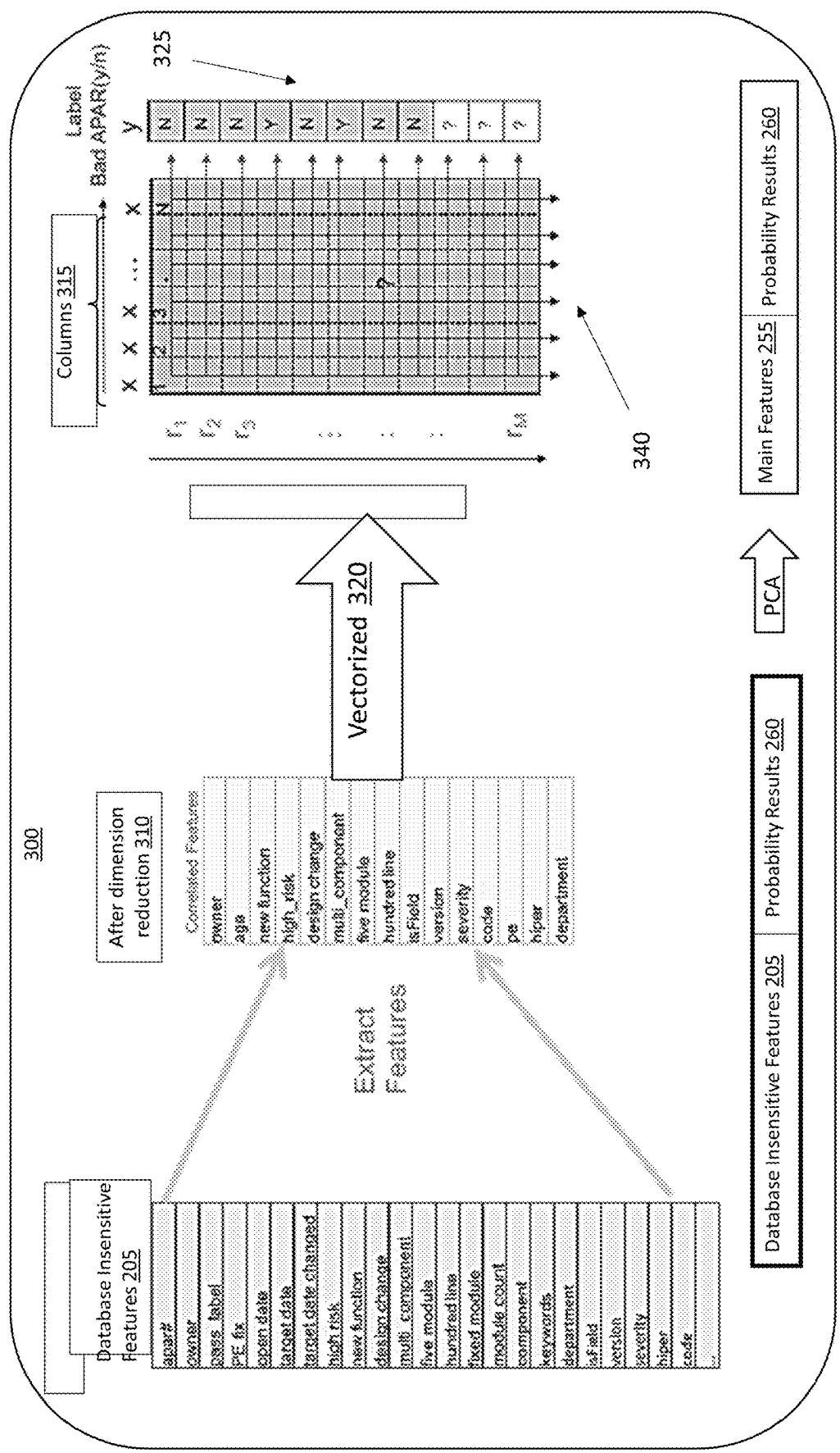
FIG. 3 is a block diagram 300 illustrating second layer dimension reduction, according to at least one embodiment.

FIG. 3 illustrates second layer dimension reduction, according to at least one embodiment. In FIG. 2, the database sensitive features 210 were reduced to include in the model only the ones that affected at least one of the three outcomes.

In FIG. 3, the dimension of database insensitive features 205 is reduced. An algorithm, such as Principal Component Analysis (PCA) is applied to reduce the database insensitive features 205 to a configurable number, for example five or ten, top main features 310.

When the input data is label encoded, machine learning algorithms may treat the order of numbers as an attribute of significance even though one does not exist. For example, machine learning algorithms may assign a higher degree of importance (weight) to a higher number in the data based only on the number being greater than a lower number.

One hot encoding addresses inaccurate correlations that may result when label encoding is incorrectly applied to the input data. For data that should be treated as categorical data, one hot encoding converts the categorical data variables to a binary vector that may be input to machine learning algorithms to improve predictions.

One-hot encoding is applied to vectorize 320 the reduced dimension 310. Each column 315 represents one of the database insensitive features 205. Column 325 shows patches (APARs) that have been identified as being high risk ("Y"). Each row $r_1$-$r_M$ in matrix 340 represents samples of each column 315.

Identifying the main features 255 from among the database insensitive features 205 is an additional measure of the degree of risk. For example, a change to only one module may be high risk if the module is included in a key component. On the other hand, changes to several modules may be low risk even if the percentage of modified lines of code is high if the modules are not in a key component. As shown, following the PCA, the output of the first and second dimension reductions are the main features 255, and the probability results 260 from FIG. 2.

Figure 4:
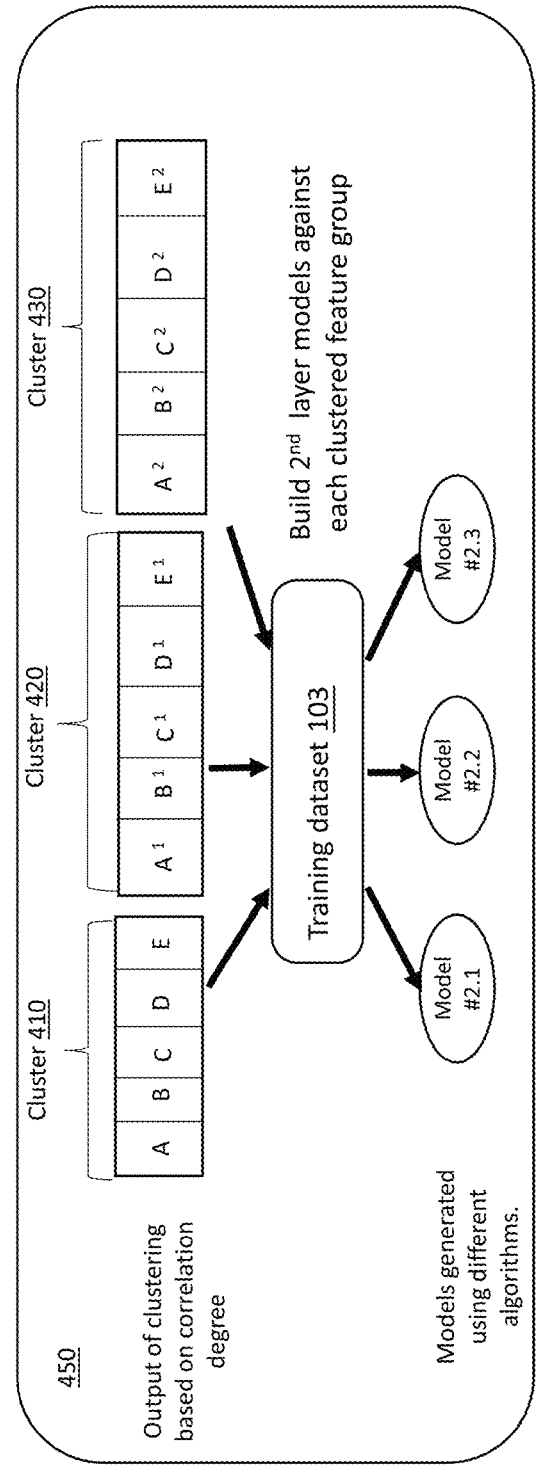
FIG. 4 is a block diagram 400 illustrating the correlation degree calculation using the second level dimension reduction, in accordance with an illustrative embodiment.

FIG. 4 illustrates the output of a correlation degree calculation using the output of the second level dimension reduction of FIG. 3.

The correlation degree calculation may use an algorithm such as the Pearson Correlation Coefficient for the population of main features 255 to create the matrix 450. In the matrix 450 the first column lists the main features 255, feature #1-feature #n, that were identified in FIG. 3. The subsequent columns show the degree of correlation with each feature in the first column. For example, feature #1 is perfectly correlated with itself (value 1). A clustering algorithm is applied to the correlated features to generate cluster groups, where for each cluster, features are selected from different clusters, and where features in the same feature group are almost non-correlated to each other. For example, two features that change together, either increasing or decreasing, are likely correlated and will likely produce the same impact, thereby skewing the result.

FIG. 4A illustrates building a second layer model using the correlated clusters output from FIG. 4.

Features in each cluster 410, 420, and 430 have a low or zero correlation to each other. However, the features in cluster 410, for example, are likely correlated with features in cluster 420 and/or cluster 430. Correlated features are not included in the same cluster when training the model to avoid the possibility of disproportionately skewing the results. As shown, models #2.1, #2.2, and #2.3 are generated.

Each cluster 410, 420, 430 is trained using the training dataset 103, and a different algorithm for each cluster, such as Support Vector Machine (SVM), Random Forest Decision Tree, or Adaboost Classifier. Each model algorithm may have better success training on a particular type of data, thereby leveraging the combined features/drawback of the models. There is a one-to-one correspondence between the number of clusters and the number of models generated. While the different models can be of the same algorithm (e.g., logistic regression), the features selected for may be different in each model.

Figure 5:
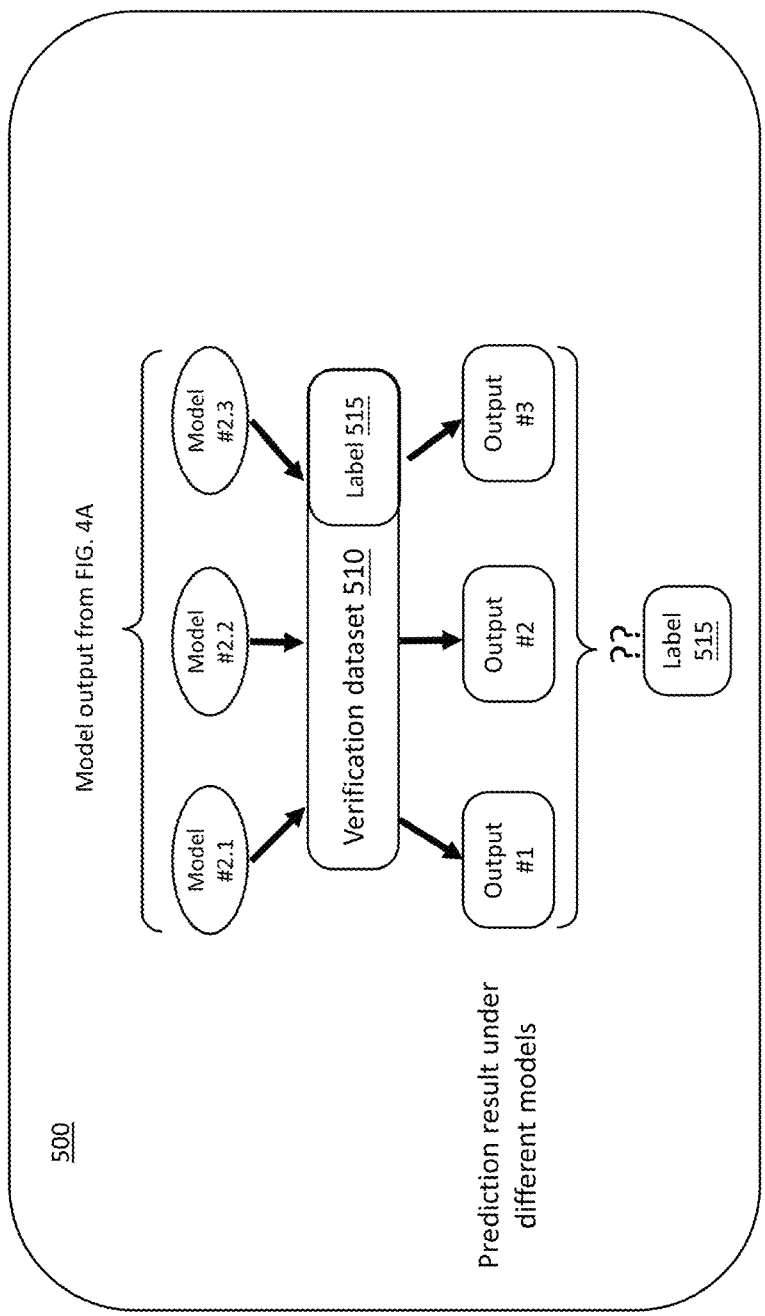
FIG. 5 illustrates generating prediction results 500 using three models, in accordance with an illustrative embodiment.

FIG. 5 illustrates generating prediction results using the three models generated in FIG. 4A as input, in accordance with an illustrative embodiment.

The models #2.1, #2.2, and #2.3 make predictions against the verification dataset 510. The label 515 is the target the machine learning model is trained to predict. The prediction results for each of the models #2.1, #2.2, and #2.3, are grouped together as output #1, output #2, and output #3 according to their respective cluster input. The union of the three outputs creates the layer three model, which is used to calculate the contribution factor against each second layer model.

The output of each model, #2.1, #2.2, and #2.3, may be considered a vector. Because each model uses a different algorithm, their predicted results differ from the actual final result. The difference may be considered a weight that describes the relationship between the outputs and the actual result. The third layer model is built to represent the relationship $$Y=W1*X1+W2*X2+W3*X3$$

where X1, X2, and X3 are the outputs of models #2.1, #2.2, and #2.3, respectively, Y is the third layer model that represents the actual final results, and W1, W2, and W3 represent the weights that are calculated after the third layer model is trained. The results X1, X2, and X3 are input to the third layer model to predict the final risk when the patch is applied. The layer model 3 predicts the set of sensitive features to run regression testing against.

Figure 6:
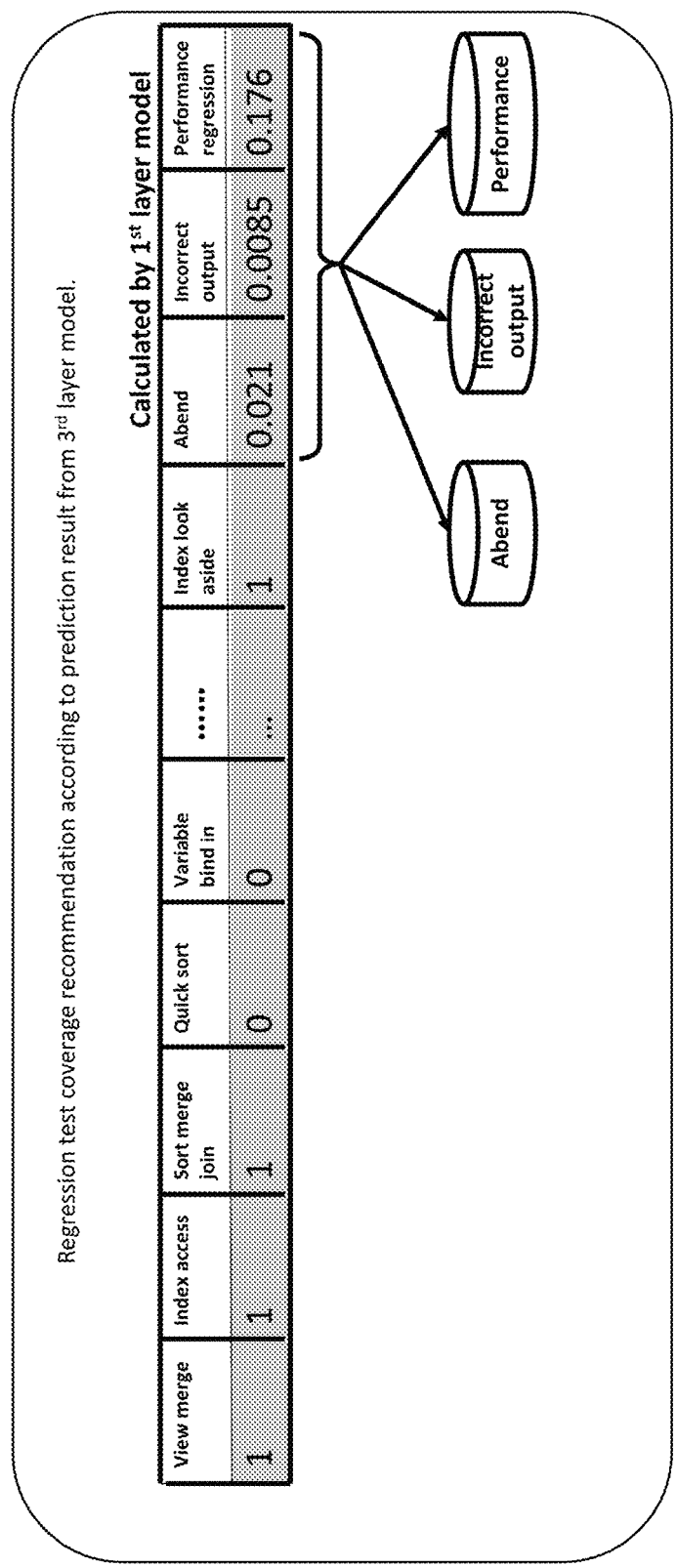
FIG. 6 illustrates regression test coverage recommendation based on prediction result of the third layer model, in accordance with an illustrative embodiment.

FIG. 6 illustrates the regression test coverage recommendation based on prediction result of the third layer model and the probability calculated in the first layer model for database errors abend, incorrect output, and performance regression. If a database patch is evaluated by the third layer model as high risk, run full regression test. If the database patch is evaluated by the third layer model as low risk, use probability computed by first layer model to select certain ranges of regression test cases whose type are system abend, incorrect output or performance issue. A configurable threshold can be set to define the ranges of probabilities that are considered low, medium, and high risk.

Figure 7:
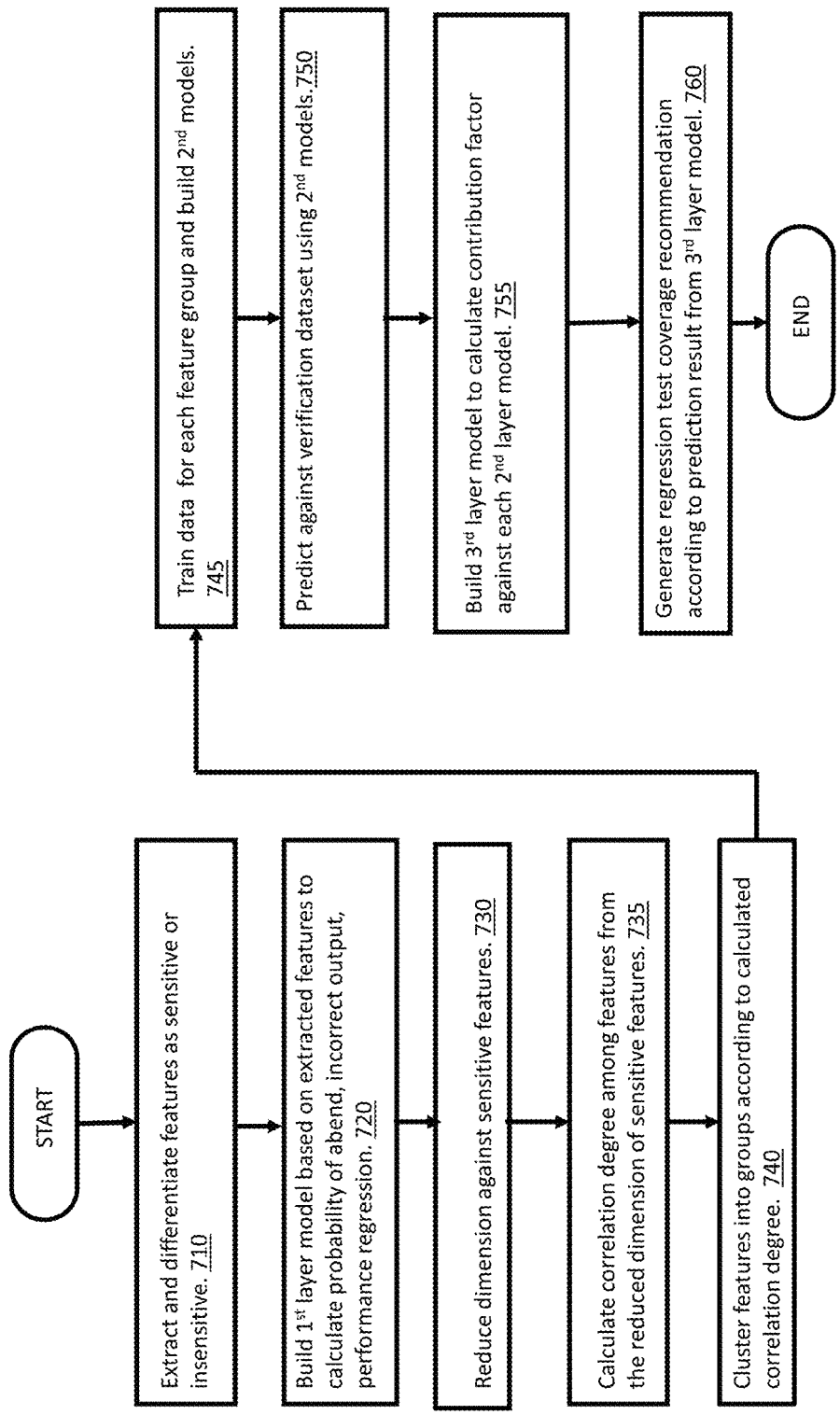
FIG. 7 is a flow chart of determining patch risk assessment, in accordance with an illustrative embodiment.

FIG. 7 is a flow chart of determining patch risk assessment, in accordance with an illustrative embodiment.

At 710, the keywords describing the environment of the patch are extracted and categorized as either database sensitive or database insensitive. At 720, the first layer model is built based on extracted features and the probability is calculated for the probability of abend, incorrect output, performance regression. At 730, the first dimension of sensitive features is reduced. At 735, the correlation degree amount features is calculated from the reduced dimension of sensitive features. At 740, the features are clustered into groups according to the calculated correlation degree. At 745, data is trained for each feature group, and the second layer models are built. At 750, the second layer model is used to predict against the verification dataset. At 755, the third layer model is built to calculate the contribution factor against each second layer model. At 760, the regression test coverage recommendation is generated, according to the prediction result from the third layer model and the probability from the first layer model.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Figure 8:
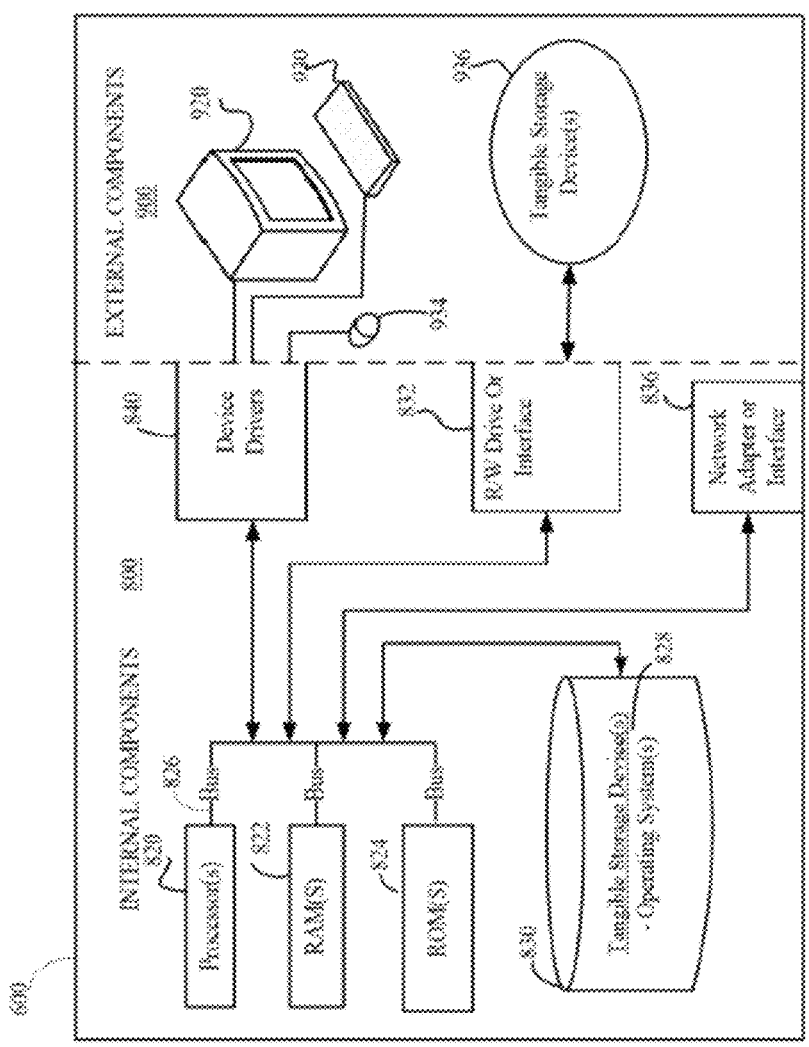
FIG. 8 depicts a simplified block diagram of a system according to an illustrative embodiment.

FIG. 8 illustrates an exemplary computing device 600 applicable for executing the algorithm of FIG. 7. Computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the algorithm of FIG. 7; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer pro Each set of internal components 800 also includes a R/W drive or interface 832 to read from and write to one or more computer-readable tangible storage devices 936 such as a CD-ROM, DVD, SSD, USB memory stick, and magnetic disk.

Each set of internal components 800 may also include network adapters (or switch port cards) or interfaces 836 such as a TCP/IP adapter cards, wireless WI-FI interface cards, or 3G, 4G, or 5G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836.

External components 900 can also include a touch screen 920 and pointing devices 930. The device drivers 840, R/W drive or interface 832 and network adapter or interface 836 comprise hardware and software (stored in storage device 830 and/or ROM 824).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method, the method comprising:
   building a first layer model of a three-layer model based on attributes that are sensitive features, wherein the building further comprises:
   extracting attributes from a problem report, wherein the problem report is associated with a patch;
   differentiating the attributes as sensitive features or insensitive features, wherein the sensitive features comprise database operations, and wherein the insensitive features describe an environment of the patch;
   creating a one-dimension row comprising the insensitive features and the sensitive features;
   calculating three probabilities, wherein the three probabilities include: a probability of system abend, a probability of incorrect output generation, and a probability of performance regression, wherein output of the first layer model is a one-dimension row of the insensitive features, and wherein the associated calculated three probabilities replace the sensitive features in the row;
   performing a first dimension reduction of the sensitive features, wherein the reducing comprises removing each sensitive feature having an indicator that it is present in a patch and does not contribute to one or more of the three probabilities; vectorizing, using one-hot encoding, the insensitive features, and performing a second dimension reduction of the insensitive features, wherein remaining insensitive features are main features;

building one or more second layer models of the three-layer model based on the main features;

building the third layer model of the three-layer model based on a verification dataset and the first layer model;

generating a regression test coverage recommendation based on prediction result of the third layer model; and updating a training dataset based on probability calculations of the first layer model.

2. The method of claim 1, wherein building one or more second layer models further comprises:

correlating and clustering the reduced dimension of main features into one or more clusters according to a correlation degree, wherein each main feature within a same cluster has a low or zero correlation to each other; and training each of the one or more clusters using a different algorithm for each cluster.

3. The method of claim 2 wherein a one-to-one correspondence exists between a number of clusters and output of a number of second layer models.

4. The method of claim 1, wherein building the third layer model further comprises:

making a prediction against a verification dataset based on the first layer model and each of the one or more second layer models, wherein outputs of the verification dataset is grouped according to its corresponding cluster input;

creating the third layer model as a union of the outputs of the verification dataset;

based on the third layer model, calculating a contribution factor of each of the outputs, wherein the contribution factor indicates a level of risk of the patch.

5. The method of claim 1, wherein a full regression test is run based on the prediction result of the patch being high risk.

6. The method of claim 1, wherein regression tests are selected to run against the patch, based on the three probabilities calculated in the first layer model.

7. The method of claim 1, wherein the attributes are classified based on Naive Bayes, and wherein the second dimension reduction is based on principle component analysis and one hot-encoding.

8. A computer program product, the computer program product comprising one or more computer-readable storage media having computer-readable program instructions embodied therewith for execution by one or more processors of one or more computers, the computer-readable program instructions comprising instructions for:

building a first layer model of a three-layer model based on attributes that are sensitive features, wherein the building further comprises:

extracting attributes from a problem report, wherein the problem report is associated with a patch;

differentiating the attributes as sensitive features or insensitive features, wherein the sensitive features comprise database operations, and wherein the insensitive features describe an environment of the patch;

creating a one-dimension row comprising the insensitive features and the sensitive features;

calculating three probabilities, wherein the three probabilities include: a probability of system abend, a probability of incorrect output generation, and a probability of performance regression, wherein output of the first layer model is a one-dimension row of the insensitive features, and wherein the associated calculated three probabilities replace the sensitive features in the row;

performing a first dimension reduction of the sensitive features, wherein the reducing comprises removing each sensitive feature having an indicator that it is present in a patch and does not contribute to one or more of the three probabilities;

vectorizing, using one-hot encoding, the insensitive features, and performing a second dimension reduction of the insensitive features, wherein remaining insensitive features are main features;

building one or more second layer models of the three-layer model based on the main features;

building the third layer model of the three-layer model based on a verification dataset and the first layer model;

generating a regression test coverage recommendation based on prediction result of the third layer model; and updating a training dataset based on probability calculations of the first layer model.

9. The computer program product of claim 8, wherein building one or more second layer models further comprises:

correlating and clustering the reduced dimension of main features into one or more clusters according to a correlation degree, wherein each main feature within a same cluster has a low or zero correlation to each other; and training each of the one or more clusters using a different algorithm for each cluster.

10. The computer program product of claim 9, wherein a one-to-one correspondence exists between a number of clusters and output of a number of second layer models.

11. The computer program product of claim 8, wherein building the third layer model further comprises:

making a prediction against a verification dataset based on the first layer model and each of the one or more second layer models, wherein outputs of the verification dataset is grouped according to its corresponding cluster input;

creating the third layer model as a union of the outputs of the verification dataset;

based on the third layer model, calculating a contribution factor of each of the outputs, wherein the contribution factor indicates a level of risk of the patch.

12. The computer program product of claim 8, wherein a full regression test is run based on the prediction result of the patch being high risk.

13. The computer program product of claim 8, wherein regression tests are selected to run against the patch, based on the three probabilities calculated in the first layer model.

14. The computer program product of claim 8, wherein the attributes are classified based on Naive Bayes, and wherein the second dimension reduction is based on principle component analysis and one hot-encoding.

15. A computer system, the computer system comprising one or more processors and one or more tangible storage media storing programming instructions for execution by the one or more processors, the program instructions comprising instructions for:

building a first layer model of a three-layer model based on attributes that are sensitive features, wherein the building further comprises:

extracting attributes from a problem report, wherein the problem report is associated with a patch;

differentiating the attributes as sensitive features or insensitive features, wherein the sensitive features comprise database operations, and wherein the insensitive features describe an environment of the patch;

creating a one-dimension row comprising the insensitive features and the sensitive features;

calculating three probabilities, wherein the three probabilities include: a probability of system abend, a probability of incorrect output generation, and a probability of performance regression, wherein output of the first layer model is a one-dimension row of the insensitive features, and wherein the associated calculated three probabilities replace the sensitive features in the row;

performing a first dimension reduction of the sensitive features, wherein the reducing comprises removing each sensitive feature having an indicator that it is present in a patch and does not contribute to one or more of the three probabilities;

vectorizing, using one-hot encoding, the insensitive features, and performing a second dimension reduction of the insensitive features, wherein remaining insensitive features are main features;

building one or more second layer models of the three-layer model based on the main features;

building the third layer model of the three-layer model based on a verification dataset and the first layer model;

generating a regression test coverage recommendation based on prediction result of the third layer model; and updating a training dataset based on probability calculations of the first layer model.

16. The computer system of claim 15, wherein building one or more second layer models further comprises:

correlating and clustering the reduced dimension of main features into one or more clusters according to a correlation degree, wherein each main feature within a same cluster has a low or zero correlation to each other; and training each of the one or more clusters using a different algorithm for each cluster.

17. The computer system of claim 15, wherein building the third layer model further comprises:

making a prediction against a verification dataset based on the first layer model and each of the one or more second layer models, wherein outputs of the verification dataset is grouped according to its corresponding cluster input;

creating the third layer model as a union of the outputs of the verification dataset;

based on the third layer model, calculating a contribution factor of each of the outputs, wherein the contribution factor indicates a level of risk of the patch.

* * * * *